US010692130B2

(12) United States Patent
Asai

(10) Patent No.: US 10,692,130 B2
(45) Date of Patent: Jun. 23, 2020

(54) NON-TRANSITORY COMPUTER-READABLE MEDIUM, INFORMATION PROCESSING TERMINAL AND CONSUMABLE ORDERING METHOD

(71) Applicant: BROTHER KOGYO KABUSHIKI KAISHA, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 498 days.

(21) Appl. No.: 15/463,303

(22) Filed: Mar. 20, 2017

(65) Prior Publication Data

US 2017/0345080 A1    Nov. 30, 2017

(30) Foreign Application Priority Data

May 30, 2016    (JP) .................................. 2016-107829

(51) Int. Cl.
*G06Q 30/00* (2012.01)
*G06Q 30/06* (2012.01)
(Continued)

(52) U.S. Cl.
CPC ....... *G06Q 30/0635* (2013.01); *G06Q 10/083* (2013.01); *H04N 1/00244* (2013.01);
(Continued)

(58) Field of Classification Search
CPC .................................................. G06Q 30/00
See application file for complete search history.

(56) References Cited

U.S. PATENT DOCUMENTS 6,937,999 B1 * 8/2005 Haines .................. G06Q 30/06
399/10
7,953,645 B2 * 5/2011 Kerker ............... G06Q 10/0875
705/26.1
(Continued)

FOREIGN PATENT DOCUMENTS

JP       2004-178175 A       6/2004
JP       2008-159022 A       7/2008
(Continued)

OTHER PUBLICATIONS

Goode, Lauren, "Amazon is ready to start automatically restocking your home for you", The Verge, dated Jan. 19, 2016. (Year: 2016 ).*
(Continued)

*Primary Examiner* — Mark A Fadok
(74) *Attorney, Agent, or Firm* — Scully, Scott, Murphy & Presser, PC

(57) ABSTRACT

A non-transitory computer-readable medium having a computer program which, when executed by a computer, causes an information processing terminal to perform displaying a first screen including a plurality of apparatus objects corresponding to each of a plurality of image processing apparatuses, receiving a user operation of designating one of the apparatus objects, receiving, from the designated apparatus, consumable information indicating a status of a consumable to be used for an operation of the image processing apparatus, determining whether a status indicated by the consumable information satisfies a replacement condition of the consumable, and when it is determined that the replacement condition is satisfied, transmitting, to a server, first ship request information for requesting the server to ship the consumable, for which it is determined in the determining of the status that the replacement condition is satisfied.

14 Claims, 11 Drawing Sheets

(51) Int. Cl.
  *G06Q 10/08* (2012.01)
  *H04N 1/00* (2006.01)

(52) U.S. Cl.
  CPC ..... *H04N 1/00411* (2013.01); *H04N 1/00413* (2013.01); *H04N 2201/0094* (2013.01)

(56) References Cited

U.S. PATENT DOCUMENTS

| | | | | |
|---|---|---|---|---|
| 8,234,307 | B1* | 7/2012 | Shure | G06Q 30/0601 707/793 |
| 2002/0073148 | A1* | 6/2002 | Haines | G06Q 10/087 709/204 |
| 2002/0163662 | A1* | 11/2002 | Kaufman | B41J 11/0075 358/1.14 |
| 2003/0139973 | A1* | 7/2003 | Claremont | G06Q 30/06 705/26.81 |
| 2003/0187922 | A1* | 10/2003 | Ohara | H04L 67/06 709/203 |
| 2004/0012644 | A1* | 1/2004 | Allen | G06K 15/00 347/7 |
| 2004/0138964 | A1* | 7/2004 | Okada | B41J 2/17546 705/26.1 |
| 2005/0018233 | A1* | 1/2005 | Parry | G06Q 10/00 358/1.14 |
| 2005/0137941 | A1* | 6/2005 | Fujinawa | G06Q 30/0207 705/14.1 |
| 2008/0071626 | A1* | 3/2008 | Hill | G06Q 10/00 705/22 |
| 2008/0126228 | A1 | 5/2008 | Nagai et al. | |
| 2009/0016743 | A1* | 1/2009 | Tye | G03G 15/55 399/8 |
| 2009/0069388 | A1* | 3/2009 | Czarnik | C07D 213/81 514/350 |
| 2012/0069388 | A1* | 3/2012 | Nakatani | G06F 3/121 358/1.15 |
| 2013/0028616 | A1* | 1/2013 | Kunihiro | G06F 3/1204 399/27 |
| 2014/0211232 | A1* | 7/2014 | Ganesan | G06F 3/1207 358/1.14 |
| 2014/0333957 | A1* | 11/2014 | Beninato | H04L 51/066 358/1.14 |
| 2015/0262272 | A1 | 9/2015 | Matsumoto | |
| 2016/0048895 | A9* | 2/2016 | Ouimet | G06Q 20/389 705/14.27 |
| 2018/0150851 | A1* | 5/2018 | Ouimet | G06Q 30/02 |

FOREIGN PATENT DOCUMENTS

| | | |
|---|---|---|
| JP | 2013-030011 A | 2/2013 |
| JP | 2013-105097 A | 5/2013 |
| JP | 2015-176476 A | 10/2015 |

OTHER PUBLICATIONS

AmazonDash, "Amazon Dadh replenishment for Brother Ink and Toner", amazondash.brother-usa.com, dated Jan. 19, 2016. (Year: 2016).*

Brother, "Ink and toner auto-fulfilment", Brother-usa.com, dated Jan. 20, 2016. (Year: 2016).*

Japanese Office Action from related JP 2016-107829 dated Mar. 3, 2020 together with English language translation.

* cited by examiner

FIG. 3A

| APPARATUS ID | AUTOMATIC ORDERING FUNCTION | INFORMATION NOTIFYING FUNCTION |
|---|---|---|
| MFP-A | OFF | ON |
| MFP-B | ON | ON |

FIG. 3B

| ACCOUNT INFORMATION | abc |
|---|---|

FIG. 3C

| ACCOUNT INFORMATION | abc |
|---|---|
| PAYMENT INFORMATION | aaaa-bbbb-cccc-dddd |
| DESTINATION INFORMATION | A-cho B-C, Kita-ku Nagoya-shi, Aichi-ken |

NON-TRANSITORY COMPUTER-READABLE MEDIUM, INFORMATION PROCESSING TERMINAL AND CONSUMABLE ORDERING METHOD

CROSS-REFERENCE TO RELATED APPLICATION

This application claims priority from Japanese Patent Application No. 2016-107829 filed on May 30, 2016, the entire subject-matter of which is incorporated herein by reference.

TECHNICAL FIELD

The disclosure relates to a program of an information processing terminal configured to order a consumable that is to be used for image processing by an image processing apparatus.

BACKGROUND

There has been disclosed an image processing apparatus having an ordering function of ordering a consumable to be used for image processing from a server on the Internet. More specifically, in the related-art image processing apparatus, a login application, a browser application and the like are installed as a program for implementing the ordering function.

SUMMARY

Illustrative aspects of the disclosure provide a program of an information processing terminal configured to order a consumable, which is to be used for image processing by an existing image processing apparatus, at an appropriate timing.

According to one illustrative aspect of the disclosure, there may be provided a non-transitory computer-readable medium having a computer program stored thereon and readable by a computer of an information processing terminal, the information processing terminal comprising a communication interface, a display and an input interface, the computer program, when executed by the computer, causes the information processing terminal to perform: displaying a first screen on the display, the first screen including a plurality of apparatus objects corresponding to each of a plurality of image processing apparatuses capable of performing communication through the communication interface; receiving a first user operation of designating one of the apparatus objects, through the input interface; receiving consumable information from the designated apparatus through the communication interface, the designated apparatus being the image processing apparatus corresponding to the apparatus object designated in the receiving of the first user operation, and the consumable information indicating a status of a consumable to be used for an operation of the image processing apparatus; determining whether a status indicated by the consumable information satisfies a replacement condition of the consumable; and in response to it being determined in the determining of the status that the replacement condition is satisfied, transmitting first ship request information to a server through the communication interface, the first ship request information being for requesting the server to ship the consumable, for which it is determined in the determining of the status that the replacement condition is satisfied, to a predetermined destination.

According to the above configuration, the information processing terminal can automatically order a consumable of an existing image processing apparatus having no ordering function at an appropriate timing. Thereby, it is possible to suppress an operation rate of the image processing apparatus from being lowered, which is caused when the consumable runs short. In the meantime, the function of transmitting the consumable information has been already implemented on many existing image processing apparatuses so as to notify the same to a so-called status monitor or the like. That is, the disclosure can also be applied to the existing image processing apparatus.

According to another illustrative aspect of the disclosure, there may be provided an information processing terminal comprising: a communication interface; a display; an input interface; and a controller configured to: display, on the display, a plurality of apparatus objects corresponding to each of a plurality of image processing apparatuses capable of performing communication through the communication interface; receive a user operation of designating one of the apparatus objects, through the input interface; receive consumable information from the designated apparatus through the communication interface, the designated apparatus being the image processing apparatus corresponding to the apparatus object designated in the receiving of the user operation, and the consumable information indicating a status of a consumable to be used for an operation of the image processing apparatus; determine whether a status indicated by the consumable information satisfies a replacement condition of the consumable; and in response to it being determined in the determining of the status that the replacement condition is satisfied, transmit first ship request information to a server through the communication interface, the first ship request information being information for requesting the server to ship the consumable, for which it is determined in the determining of the status that the replacement condition is satisfied, to a predetermined destination.

According to still another illustrative aspect of the disclosure, there may be provided a consumable ordering method of ordering a consumable to be used for an operation of an image processing apparatus by using an information processing terminal, the information processing terminal comprising a communication interface, a display and an input interface, the consumable ordering method comprising: displaying, on the display, a plurality of apparatus objects corresponding to each of a plurality of image processing apparatuses capable of performing communication through the communication interface; receiving a user operation of designating one of the apparatus objects, through the input interface; receiving consumable information from the designated apparatus through the communication interface, the designated apparatus being the image processing apparatus corresponding to the apparatus object designated in the receiving of the user operation, and the consumable information indicating a status of the consumable; determining whether a status indicated by the consumable information satisfies a replacement condition of the consumable; and in response to it being determined in the determining of the status that the replacement condition is satisfied, transmitting first ship request information to a server through the communication interface, the first ship request information being for requesting the server to ship the consumable, for which it is determined in the determining of the status that the replacement condition is satisfied, to a predetermined destination.

BRIEF DESCRIPTION OF THE DRAWINGS

FIGS. 3A-3C depict examples of information that is to be stored in each apparatus configuring the system 100, in which FIG. 3A depicts function information to be stored in multi-function peripherals 10A, 10B, FIG. 3B depicts account information to be stored in the information processing terminal 50, and FIG. 3C depicts account information, payment information and destination information to be stored in a server 80;

FIGS. 8A and 8B depict display examples of a display 53, in which FIG. 8A depicts a main screen and FIG. 8B depicts a device selection screen;

FIGS. 9A and 9B depict display examples of a status screen, in which FIG. 9A depicts display information C, Y="gray", and FIG. 9B depicts display information C="gray" and display information Y="emphasis"; and FIGS. 10A and 10B depict display example of the display 53, in which FIG. 10A depicts a confirmation screen overlapping over the status screen and FIG. 10 B depicts an inquiry screen.

DETAILED DESCRIPTION

In a general image processing apparatus, it is difficult to add a new function to the general image processing apparatus after shipment, as compared to an information processing terminal such as a PC. That is, the ordering function disclosed in Patent Document 1 can be implemented to an image processing apparatus that is to be produced from now, but is difficult to be implemented to an existing image processing apparatus.

Therefore, the disclosure provides a program of an information processing terminal configured to order a consumable, which is to be used for image processing by an existing image processing apparatus, at an appropriate timing.

Hereinafter, an illustrative embodiment of the disclosure will be described with reference to the drawings. Meanwhile, the illustrative embodiment to be described later is only an example of the disclosure, and the illustrative embodiment of the disclosure can be appropriately changed without changing the gist of the disclosure. For example, an execution sequence of each processing to be described later can be appropriately changed without changing the gist of the disclosure.

Figure 1:
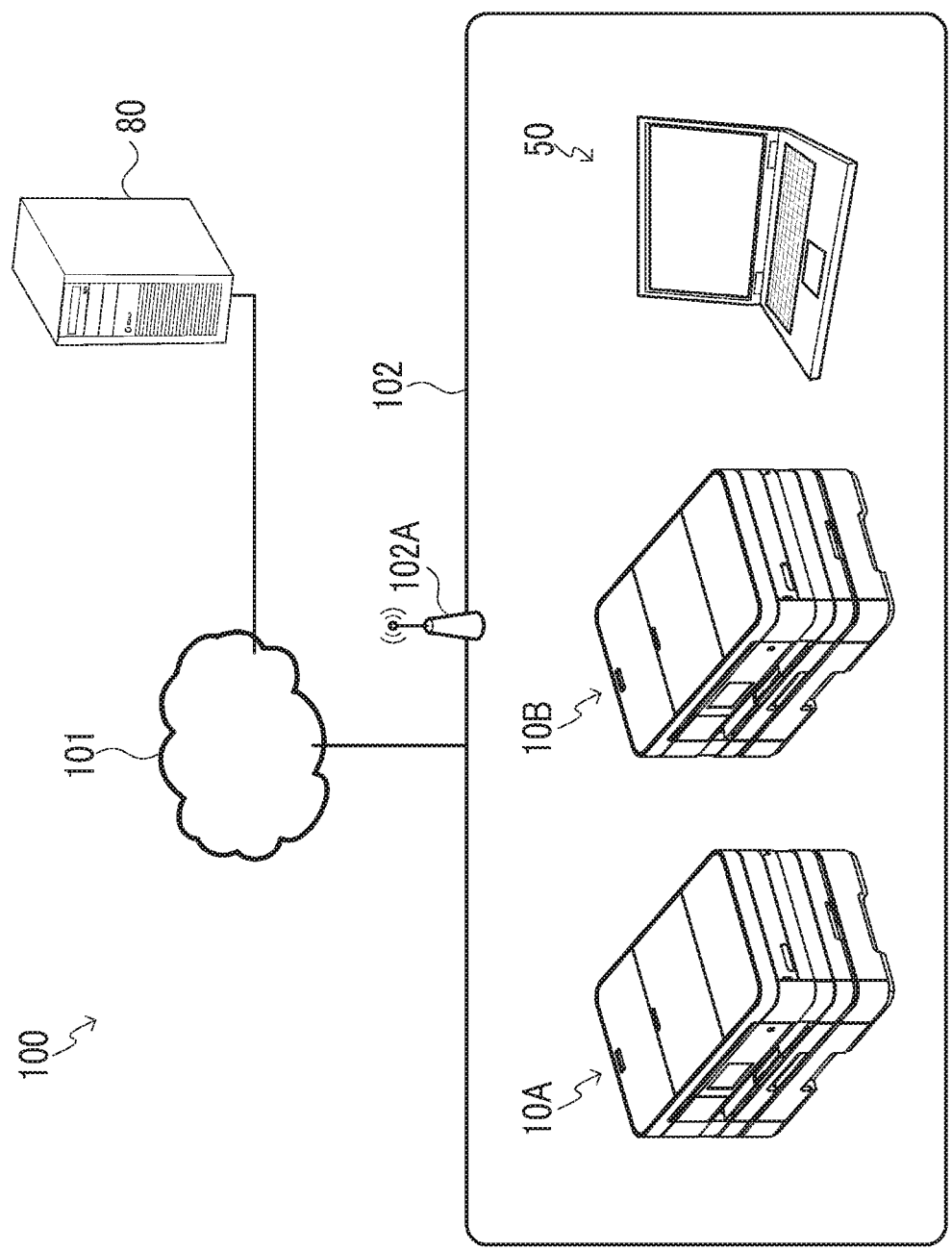
FIG. 1 depicts an outline of a system 100 in accordance with an illustrative embodiment.

FIG. 1 depicts an outline of a system 100 in accordance with an illustrative embodiment. The system 100 shown in FIG. 1 includes multi-function peripherals 10A, 10B (hereinafter, also collectively referred to as "multi-function peripheral 10"), an information processing terminal 50 and a server 80. The multi-function peripheral 10, the information processing terminal 50 and the server 80 can perform communication with each other via a communication network. The communication network is not particularly limited and may be an Internet 101, a wired LAN, a wireless LAN 102 or a combination thereof, for example.

The multi-function peripheral 10 and the information processing terminal 50 belong to the wireless LAN 102. That is, the multi-function peripheral 10 and the information processing terminal 50 can perform communication with each other via an access point (not shown) of the wireless LAN 102. Also, the wireless LAN 102 is connected to the Internet 101 through a router 102A. Also, the server 80 is connected to the Internet 101. That is, the multi-function peripheral 10 and the information processing terminal 50 can perform communication with the server 80 via the Internet 101 from the router 102A.

Figure 2A:
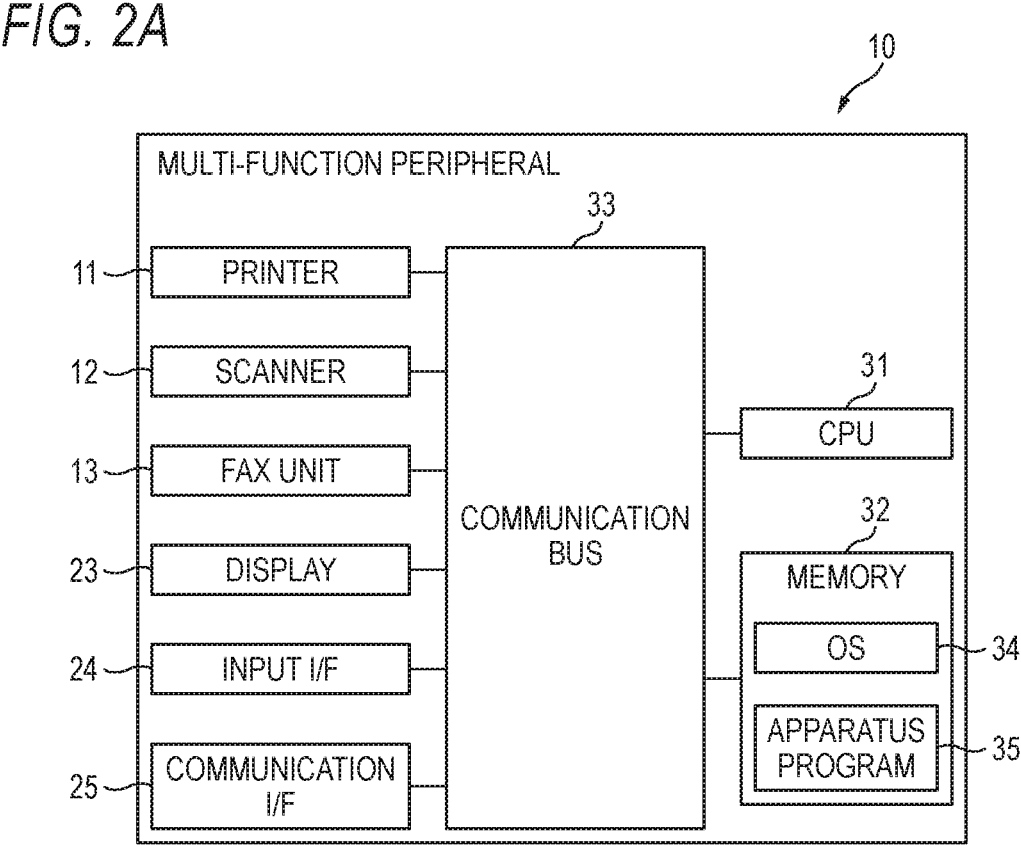
FIG. 2A is a block diagram of a multi-function peripheral 10.

As shown in FIG. 2A, the multi-function peripheral 10 mainly has a printer 11, a scanner 12, a FAX unit 13, a display 23, an input I/F 24, a communication I/F 25, a CPU 31, a memory 32 and a communication bus 33. The respective constitutional elements configuring the multi-function peripheral 10 are connected to each other through the communication bus 33. The multi-function peripheral 10 is an example of the image processing apparatus. The configurations of the multi-function peripherals 10A, 10B may be the same or not. In the illustrative embodiment, the multi-function peripheral 10A is identified by an apparatus ID "MFP-A" and the multi-function peripheral 10B is identified by an apparatus ID "MFP-B". The apparatus ID is an example of the apparatus identification information.

The printer 11 is configured to execute a print operation of recording an image expressed by image data onto a sheet. As a recording method of the printer 11, a well-known method such as an inkjet method and an electrophotographic method can be adopted. The scanner 12 is configured to execute a scan operation of reading an image recorded on a document and generating image data. The FAX unit 13 is configured to execute a FAX transmission operation of FAX-transmitting image data to an external apparatus and a FAX receiving operation of FAX-receiving image data from the external apparatus. In the meantime, the multi-function peripheral 10 may have at least one of the printer 11, the scanner 12 and the FAX unit 13.

Although not shown, the printer 11 has a mounting unit to which an ink cartridge is to be mounted. An ink cartridge having black ink reserved therein (hereinafter, referred to as "ink cartridge B"), an ink cartridge having cyan ink reserved therein (hereinafter, referred to as "cyan cartridge C"), an ink cartridge having magenta ink reserved therein (hereinafter, referred to as "magenta cartridge M") and an ink cartridge having yellow ink reserved therein (hereinafter, referred to as "yellow cartridge Y") are independently attached and detached to and from the mounting unit. The printer 11 is configured to record an image onto a sheet by using the inks reserved in the respective ink cartridges. The ink cartridge is an example of the consumable that is to be used for the print operation.

That is, an amount of ink reserved in the ink cartridge gradually decreases whenever the printer 11 executes the print operation. When the ink reserved in the ink cartridge runs short, the printer 11 cannot execute the print operation any more. In other words, in order for the printer 11 to further execute the print operation, it is necessary to detach the ink cartridge in which the ink has run short from the mounting unit and to mount a new ink cartridge having ink reserved therein to the mounting unit (i.e., it is necessary to replace the ink cartridge).

Also, the printer 11 has a sensor configured to detect an amount of ink (hereinafter, referred to as "remaining ink amount") reserved in each ink cartridge mounted to the mounting unit and to output a detection signal indicative of the detected remaining ink amount to the CPU 31. The detection signal indicates a current remaining ink amount by percentage while setting a remaining ink amount of a new ink cartridge as 100%. That is, the CPU 31 can perceive the respective remaining ink amounts of the plurality of ink cartridges mounted to the mounting unit. The sensor is implemented by an optical sensor, a mechanical sensor, a software sensor or a combination thereof, for example.

The input I/F 24 is a user interface configured to receive a user's input operation. Specifically, the input I/F 24 has buttons and is configured to output a variety of operation signals associated with the pushed buttons to the CPU 31. In addition, the input I/F 24 may have a touch sensor having a film shape and superimposed on a display surface of the display 23. An operation of designating an object displayed on the display surface of the display 23 and an operation of inputting a character string or a number string are examples of the user operation. The "object" includes a character string, an icon, a button, a link, a pull-down menu and the like displayed on the display 23, for example.

The input I/F 24 implemented as a touch sensor is configured to output position information indicative of a position on the display surface touched by the user. Meanwhile, in the specification, the "touch" includes all operations of bringing an input medium into contact with the display surface. Also, although the input medium is not in contact with the display surface, "hover" or "floating touch" of bringing the input medium close to a position at which a distance between the input medium and the display surface is very small may be included in the concept of the "touch." Also, the input medium may be a user's finger, a touch pen or the like. A user operation of tapping a position of an icon displayed on the display 23 is an example of the designation operation of designating the icon.

The communication I/F 25 is an example of the communication interface for performing communication with an external apparatus through the communication network. That is, the multi-function peripheral 10 is configured to transmit a variety of information to the information processing terminal 50 and the server 80 through the communication I/F 25 and to receive a variety of data or information from the information processing terminal 50 and the server 80 through the communication I/F 25. Although a specific communication protocol of the communication I/F 25 is not particularly limited, Wi-Fi (registered trademark of the Wi-Fi Alliance) can be adopted.

The CPU 31 is configured to control overall operations of the multi-function peripheral 10. The CPU 31 is configured to obtain and execute a variety of programs (which will be described later) from the memory 32, based on a variety of signals output from the input I/F 24 and a variety of information obtained from the external apparatus through the communication I/F 25. That is, the CPU 31 and the memory 32 configure an example of the controller.

In the memory 32, an OS 34 and an apparatus program 35 are stored. In the meantime, the apparatus program 35 may be a single program or a set of a plurality of programs. Also, in the memory 32, data or information necessary to execute the apparatus program 35 is stored. The memory 32 is configured by a RAM, a ROM, an EEPROM, an HDD, a portable storage medium such as a USB memory to be detachably mounted to the multi-function peripheral 10, a buffer of the CPU 31 or a combination thereof, for example.

The memory 32 may be a computer-readable storage medium. The computer-readable storage medium is a non-transitory medium. The non-transitory medium includes a recording medium such as a CD-ROM and a DVD-ROM as well as the above-described media. Also, the non-transitory medium is a tangible medium. In the meantime, an electric signal for carrying a program to be downloaded from a server or the like on the Internet 101 is a computer-readable signal medium, which is a kind of the computer-readable storage medium, but is not included in the non-transitory computer-readable storage medium.

The apparatus program 35 of the multi-function peripherals 10A, 10B has a variety of functions implemented therein. The apparatus program 35 includes at least a function of enabling the printer 11 to execute the print operation, a function of enabling the scanner 12 to execute the scan operation and a function of enabling the FAX unit 13 to execute the FAX transmission operation and the FAX receiving operation. Also, the apparatus program 35 may have a manual ordering function, an automatic ordering function and an information notifying function or not.

The manual ordering function is a function of requesting the server 80 to ship a new ink cartridge in accordance with a user's instruction. That is, when a user operation of instructing execution of the manual ordering function is received through the input I/F 24, the apparatus program 35 transmits second ship request information (which will be described later) to the server 80 through the communication I/F 25. This processing corresponds to S51 and S58, which will be described later. In the illustrative embodiment, it is assumed that the manual ordering function is implemented in the apparatus program 35 of the multi-function peripherals 10A, 10B.

The automatic ordering function is a function of automatically requesting the server 80 to ship a new ink cartridge when the remaining ink amount of the ink cartridge becomes less than a threshold value. For example, the apparatus program 35 is configured to repeatedly obtain the detection signal output from the sensor with a predetermined time interval and to compare the remaining ink amount indicated by the obtained detection signal and the threshold value (for example, 10%). When it is determined that the remaining ink amount is less than the threshold value, the apparatus program 35 transmits first ship request information (which will be described later) to the server 80 through the communication I/F 25. This processing corresponds to S35 and S39, which will be described later.

Also, the memory 32 is configured to store therein an ordering completion flag. For the ordering completion flag, a first value "ON" indicating that the ink cartridge has been ordered to the server 80 or a second value "OFF" indicating that the ink cartridge has not been ordered to the server 80 is set for each of the plurality of ink cartridges mounted to the mounting unit. A default value of the ordering completion flag is the second value "OFF". Hereinafter, the ordering completion flag corresponding to the ink cartridge B is referred to as "ordering completion flag B", the ordering completion flag corresponding to the ink cartridge C is referred to as "ordering completion flag C", the ordering completion flag corresponding to the ink cartridge M is referred to as "ordering completion flag M", and the ordering completion flag corresponding to the ink cartridge Y is referred to as "ordering completion flag Y".

The apparatus program 35 sets the first value "ON" to the ordering completion flag C when the ink cartridge C is ordered by the manual ordering function and the automatic ordering function, for example. On the other hand, when the ink cartridge C mounted to the mounting unit is replaced, the apparatus program 35 sets the second value "OFF" to the ordering completion flag C. The apparatus program 35 can recognize the replacement of the ink cartridge C by reading an IC chip mounted to the ink cartridge C, for example.

Also, the memory 32 is configured to store therein a cancel flag. For the cancel flag, a first value "ON" indicating that the automatic ordering function is to be stopped or a second value "OFF" indicating that the automatic ordering function is to be executed is set for each of the plurality of ink cartridges mounted to the mounting unit. A default value of the ordering completion flag is the second value "OFF". The details of the cancel flag may be the same as the cancel flag to be stored in the memory 62.

When ordering restraint information (which will be described later) is received from the information processing terminal 50 through the communication I/F 25, the apparatus program 35 sets the first value "ON" to the corresponding cancel flag. When it is determined that the remaining ink amount is less than the threshold value and the second value "OFF" is set to the cancel flag, the apparatus program 35 transmits the first ship request information to the server 80. On the other hand, when it is determined that the remaining ink amount is less than the threshold value and the first value "ON" is set to the cancel flag, the apparatus program 35 sets the second value "OFF" to the cancel flag without transmitting the first ship request information. This processing corresponds to S35 and S38 to S42, which will be described later, for example.

The information notifying function is a function of transmitting consumable information and ordering completion information to the information processing terminal 50. The consumable information is information indicative of a status of the ink cartridge. More specifically, the consumable information is information indicative of the remaining ink amount of each of the plurality of ink cartridges mounted to the mounting unit. The ordering completion information is information indicating that the manual ordering function or the automatic ordering function has been executed. Hereinafter, the ordering completion information corresponding to the ink cartridge B is referred to as "ordering completion information B", the ordering completion information corresponding to the ink cartridge C is referred to as "ordering completion information C", the ordering completion information corresponding to the ink cartridge M is referred to as "ordering completion information M" and the ordering completion information corresponding to the ink cartridge Y is referred to as "ordering completion information Y".

When the transmission request information is received from the information processing terminal 50 through the communication I/F 25, for example, the apparatus program 35 obtains the detection signal from the sensor. Then, the apparatus program 35 transmits the consumable information indicative of contents of the obtained detection signal to the information processing terminal 50 through the communication I/F 25. That is, the apparatus program 35 is configured to transmit the consumable information indicative of the remaining ink amounts of all the ink cartridges, as a response of the transmission request information received from the information processing terminal 50.

Also, when the transmission request information is received from the information processing terminal 50 through the communication I/F 25, for example, the apparatus program 35 determines the setting values of the ordering completion flags corresponding to the respective ink cartridges. When the first value "ON" is set to the ordering completion flag C, for example, the apparatus program 35 transmits the ordering completion information C to the information processing terminal 50 through the communication I/F 25. On the other hand, when the second value "OFF" is set to the ordering completion flags B, M, Y, for example, the apparatus program 35 does not transmit the ordering completion information B, M, Y to the information processing terminal 50.

The timing at which the consumable information is to be transmitted is not limited to the above example. For example, the consumable information may be transmitted at a timing preset in the apparatus program 35, a timing at which the remaining ink amount indicated by the detection signal becomes less than the threshold value or the like. Also, the timing at which the ordering completion information is to be transmitted is not limited to the above example. For example, the ordering completion information may be transmitted at a timing at which the manual ordering function or the automatic ordering function has been executed, or the like.

Also, the memory 32 is configured to store therein function information. The function information includes first function information indicating whether the automatic ordering function is implemented in the apparatus program 35 and second function information indicating whether the information notifying function is implemented in the apparatus program 35. A first value "ON" indicating that a corresponding function is implemented or a second value "OFF" indicating that a corresponding function is not implemented is set to the function information. The function information is already registered in the memory 32 by a manufacturing maker upon shipment of the multi-function peripheral 10, for example. That is, in an example of FIG. 3A, the automatic ordering function is not implemented in the apparatus program 35 of the multi-function peripheral 10A and the information notifying function is implemented therein. Also, both the automatic ordering function and the information notifying function are implemented in the apparatus program 35 of the multi-function peripheral 10B.

Figure 2B:
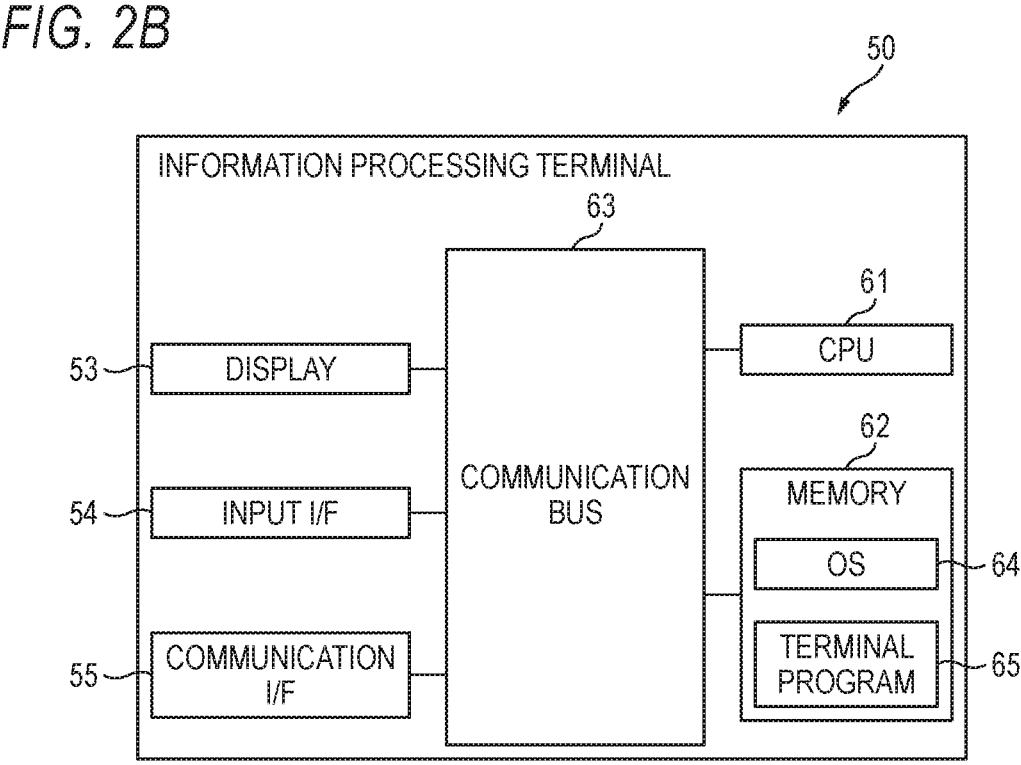
FIG. 2B is a block diagram of an information processing terminal 50.
Figure 4:
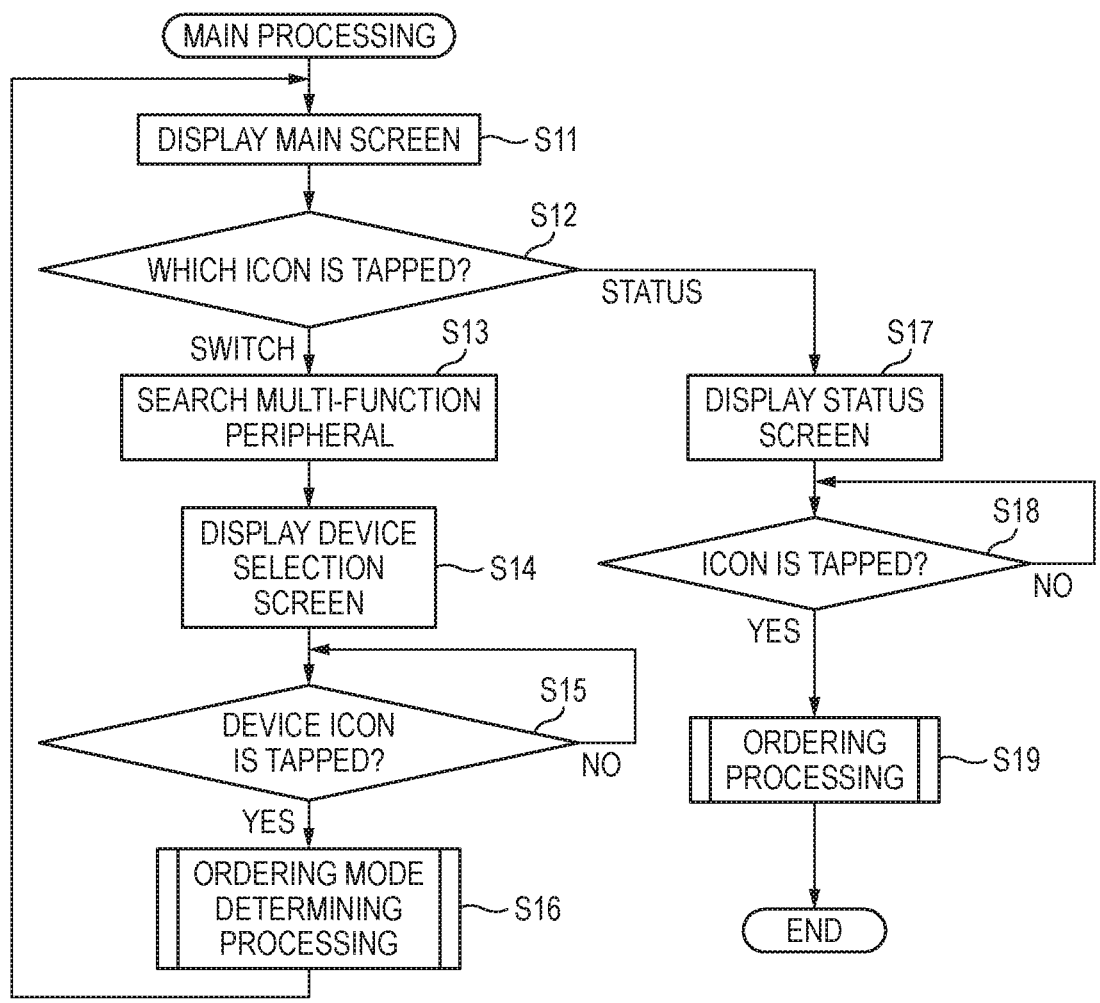
FIG. 4 is a flowchart of main processing.
Figure 5:
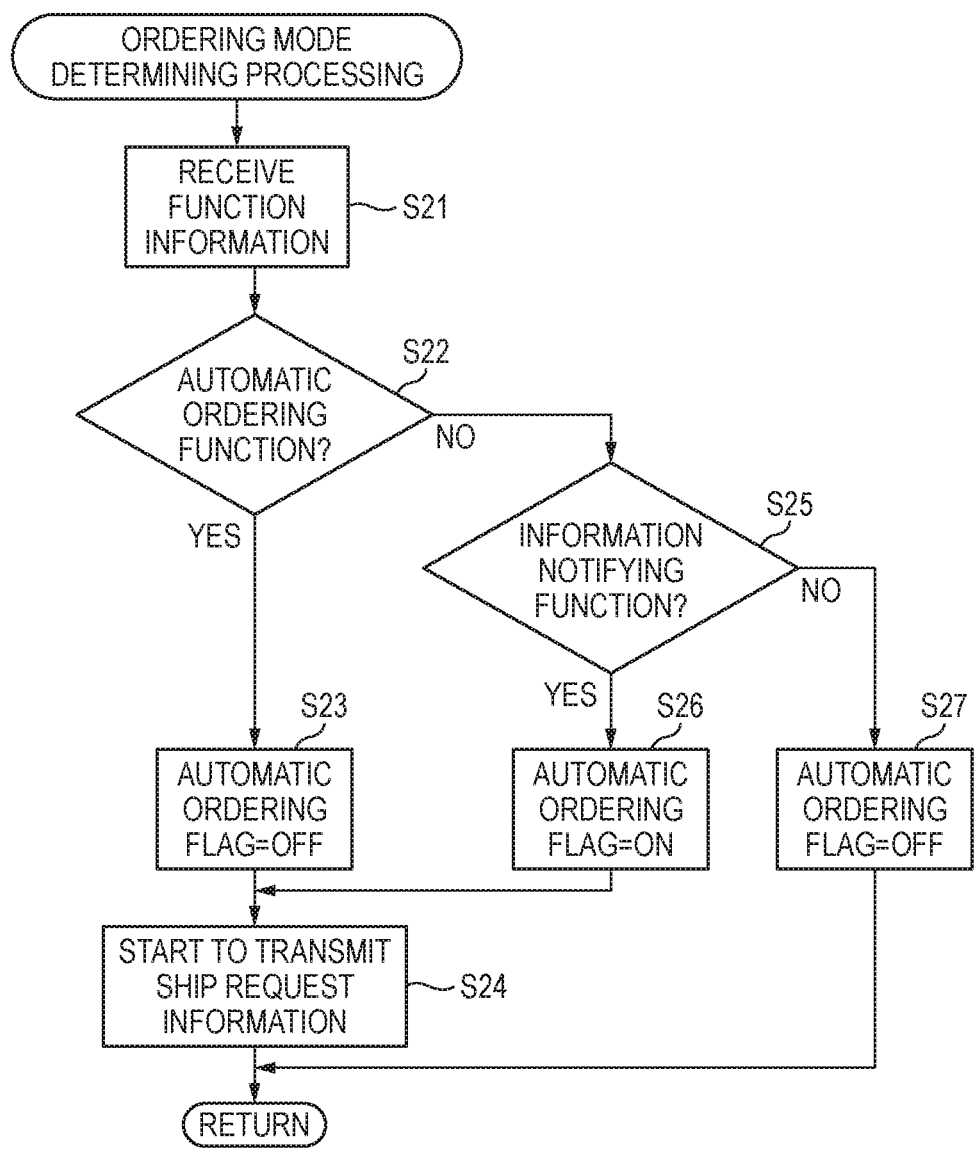
FIG. 5 is a flowchart of ordering mode determining processing.
Figure 6:
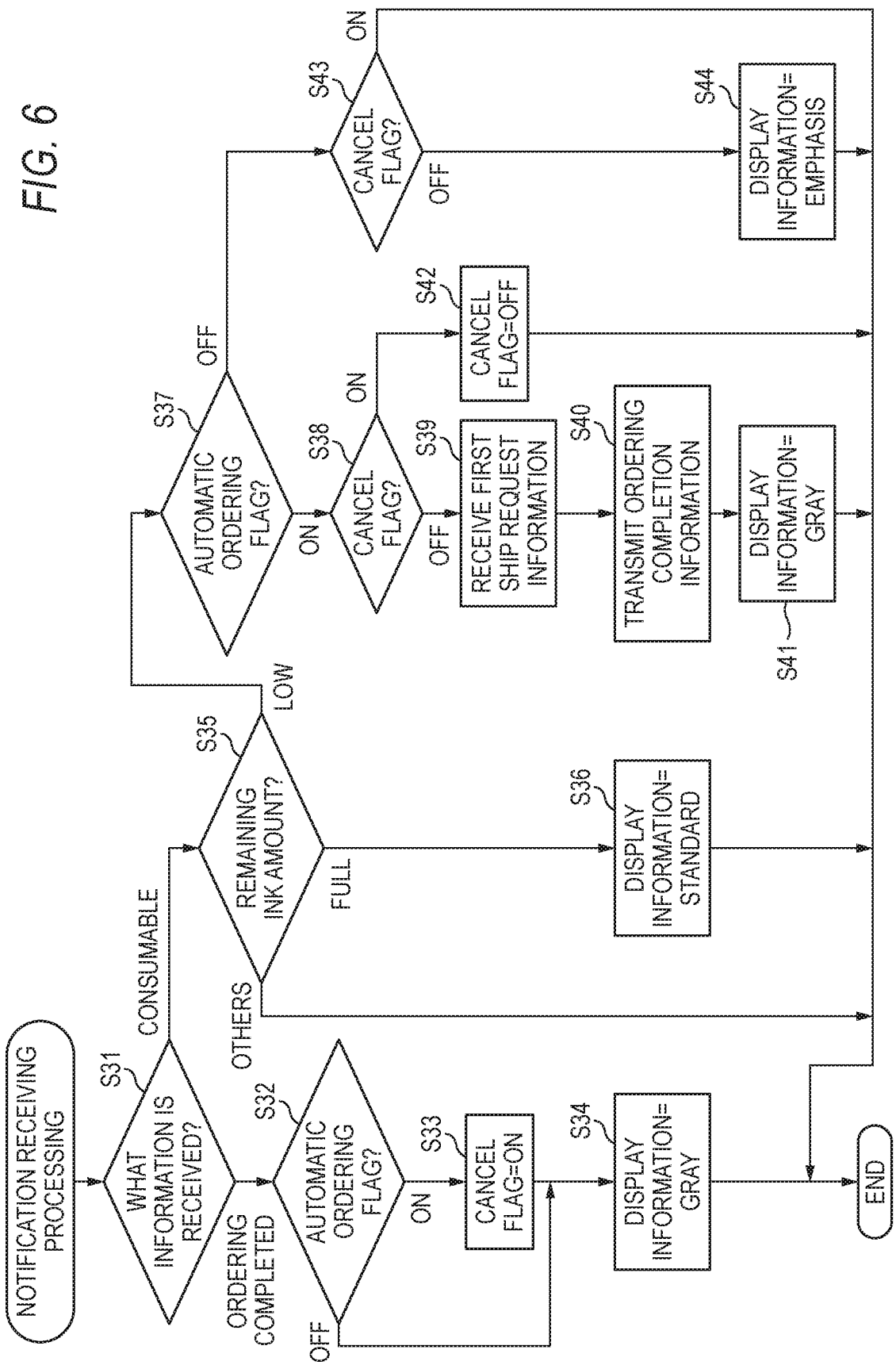
FIG. 6 is a flowchart of notification receiving processing.
Figure 7:
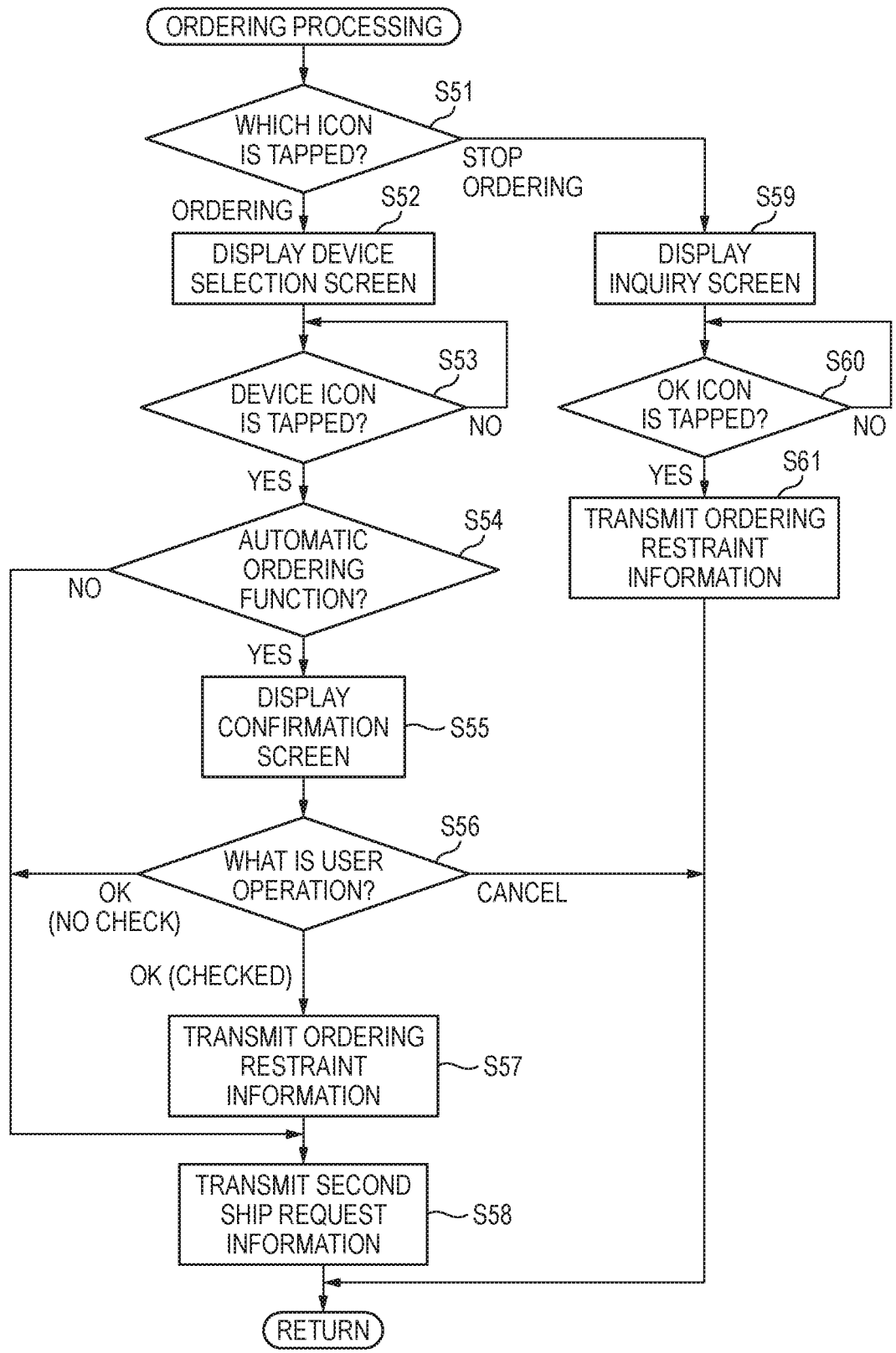
FIG. 7 is a flowchart of ordering processing.

As shown in FIG. 2B, the information processing terminal 50 mainly has a display 53, an input I/F 54, a communication I/F 55, a CPU 61, a memory 62 and a communication bus 63. Since the display 53, the input I/F 54, the communication I/F 55, the CPU 61, the memory 62 and the communication bus 63 included in the information processing terminal 50 have the same configurations as the display 23, the input I/F 24, the communication I/F 25, the CPU 31, the memory 32 and the communication bus 33 included in the multi-function peripheral 10, the descriptions thereof are omitted. The information processing terminal 50 may be a portable phone, a smart phone, a tablet terminal, a PC or the like, for example. The memory 62 is configured to store therein an OS 64 and a terminal program 65.

The terminal program 65 is a so-called status monitor configured to notify a status of the multi-function peripheral 10 to the user. That is, the terminal program 65 is configured to receive the consumable information from the multi-function peripheral 10 through the communication I/F 55 and to display a status of the consumable indicated by the received consumable information on the display 53. Also, the terminal program 65 further has the automatic ordering function and the manual ordering function. The functions implemented in the terminal program 65 are not limited thereto, and may further include a function of instructing the multi-function peripheral 10 to execute the print operation, the scan operation or the FAX transmission operation, for example.

For example, as shown in FIG. 3B, the memory 62 may be configured to store therein account information. The account information is not stored in the memory 62 upon install of the terminal program 65, for example. The terminal program 65 is configured to receive a user operation of inputting payment information and destination information shown in FIG. 3C through the input I/F 54, for example. The payment information is a credit card number, for example. Then, the terminal program 65 is configured to transmit the input payment information and destination information to the server 80 through the communication I/F 55. Then, the terminal program 65 is configured to receive the account information transmitted by the server 80, as a response of the payment information and the destination information, from the server 80 through the communication I/F 55 and to store the same in the memory 62.

Also, the memory 62 is configured to store therein an automatic ordering flag. The automatic ordering flag is information indicating whether the automatic ordering function of the information processing terminal 50 is valid. A first value "ON" indicating that the automatic ordering function of the information processing terminal 50 is to be validated or a second value "OFF" indicating that the automatic ordering function is to be invalidated is set to the automatic ordering flag. A default value of the automatic ordering flag is the second value "OFF".

Also, the memory 62 is configured to store therein a cancel flag. The cancel flag is information indicating whether or not to execute processing of S39 (which will be described later) when the status of the consumable indicated by the consumable information satisfies the replacement condition. A first value "ON" indicating that the processing of S39 (which will be described later) is not to be executed when the status of the consumable indicated by the consumable information satisfies the replacement condition or a second value "OFF" indicating that the processing of S39 is to be executed when the status of the consumable indicated by the consumable information satisfies the replacement condition is set to the cancel flag. A default value of the cancel flag is the second value "OFF".

In addition, the memory 62 is configured to store therein display information. The display information is information indicative of a display aspect of ordering icons 131B, 131C, 131M, 131Y to be displayed on a status screen (which will be described later). "Standard" for displaying the ordering icons 131B, 131C, 131M, 131Y in a default display aspect, "emphasis" for displaying the same in a more emphasized display aspect than the default or "gray" for disabling the same from being selected is set to the display information. A default value of the display information is "standard".

The memory 62 is configured to store therein the cancel flag and the display information corresponding to each of the plurality of ink cartridges mounted to the mounting unit of the multi-function peripheral 10A. Hereinafter, the information corresponding to the ink cartridge B is referred to as "cancel flag B" and "display information B", the information corresponding to the ink cartridge C is referred to as "cancel flag C" and "display information C", the information corresponding to the ink cartridge M is referred to as "cancel flag M" and "display information M" and the information corresponding to the ink cartridge Y is referred to as "cancel flag Y" and "display information Y".

The server 80 is a server configured to provide a so-called WEB shopping service. More specifically, the server 80 is configured to ship a designated consumable to a designated destination, in response to a request from the multi-function peripheral 10 or the information processing terminal 50. The server 80 may be configured by a single server or a plurality of servers. Also, an operator's operation (for example, an operation of picking out the designated consumable from a storage, an operation of packing the picked consumable, and the like) may be performed after the server 80 receives the request until the consumable is shipped.

First, as an advance preparation, the server 80 is configured to receive the payment information and the destination information from the multi-function peripheral 10 or the information processing terminal 50. Then, the server 80 is configured to generate the account information for uniquely identifying the received payment information and destination information. Then, as shown in FIG. 3C, the server 80 is configured to associate the received payment information and destination information with the generated account information and to store the same in a server memory. Then, the server 80 is configured to transmit the generated account information to the multi-function peripheral 10 or the information processing terminal 50, which is a transmission destination of the payment information and destination information. The processing of shipping the consumable will be described in detail with reference to FIGS. 4 to 7.

Operations of the system 100 in accordance with the illustrative embodiment are described with reference to FIGS. 4 to 7.

A flowchart of the specification basically indicates processing that is to be executed by the CPUs 31, 61 in accordance with commands described in the program. That is, in the below descriptions, the processing of "determination", "extraction", "selection", "calculation", "determining", "specifying", "control" and the like indicates the processing of the CPUs 31, 61. The processing that is to be executed by the CPUs 31, 61 includes hardware controls through the OS 34, 64, too. Also, in the specification, "data" is expressed by a bit string that can be read by a computer. The data having substantially the same meaning and the different formats is handled as the same data. This also applies to the "information" of the specification.

[Main Processing]

Figure 8A:
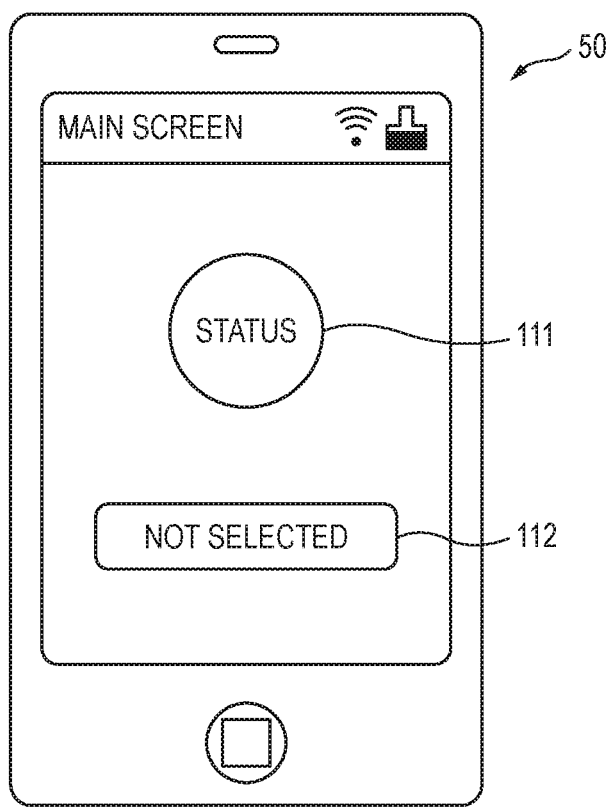

First, when the user operation through the input I/F 54 starts, for example, the terminal program 65 displays a main screen shown in FIG. 8A on the display 53 (S11). The main screen includes a [status] icon 111 and a switching icon 112. The [status] icon 111 corresponds to an instruction for displaying a status screen (which will be described later) on the display 53. The switching icon 112 corresponds to an instruction for switching the multi-function peripheral 10 monitoring a status (hereinafter, referred to as "designated apparatus"). When the designated apparatus is not designated, a character string "not selected" is described in the switching icon 112. The terminal program 65 receives a user operation on the main screen through the input I/F 54 (S12).

Subsequently, when a designation on the switching icon 112 is received through the input I/F 54 (S12: switching), for example, the terminal program 65 searches the multi-function peripherals 10A, 10B capable of performing communication through the communication I/F 55 (S13). Since the method of searching the multi-function peripherals 10A, 10B capable of performing communication has been well known, the detailed description thereof is omitted. For example, the search can be performed using the SNMP (abbreviation of Simple Network Management Protocol). In the illustrative embodiment, it is assumed that the multi-function peripherals 10A, 10B have been found.

Figure 8B:
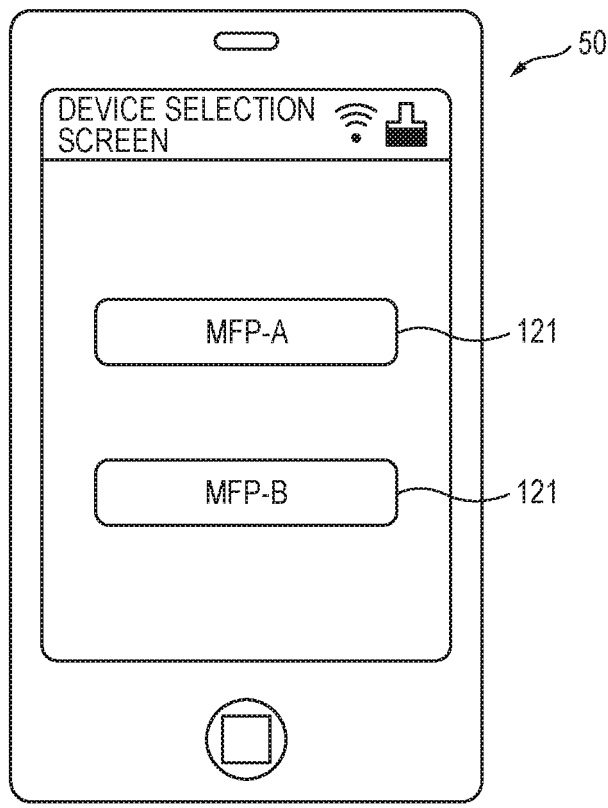

Then, the terminal program 65 displays a device selection screen shown in FIG. 8B on the display 53 (S14). The device selection screen includes device icons 121, 122. The device icons 121, 122 are examples of the apparatus objects corresponding to the multi-function peripherals 10A, 10B found in S13. Also, the apparatus IDs of the corresponding multi-function peripherals 10A, 10B are described in the device icons 121, 122. The terminal program 65 receives a user operation on the device selection screen through the input I/F 54 (S15). The processing of S14 is an example of the first display processing, and the processing of S15 is an example of the first reception processing.

Then, when a designation on the device icon 121 is received through the input I/F 54 (S15: Yes), for example, the terminal program 65 determines the multi-function peripheral 10A corresponding to the device icon 121, as the designated apparatus. More specifically, the terminal program 65 stores the apparatus ID "MFP-A" of the multi-function peripheral 10A in the memory 32, as an designated apparatus ID. Also, the terminal program 65 executes ordering mode determining processing (S16). The ordering mode determining processing is described in detail with reference to FIG. 5.

[Ordering Mode Determining Processing]

First, the terminal program 65 receives the function information from the multi-function peripheral 10A, which is the designated apparatus, through the communication I/F 55 (S21). More specifically, the terminal program 65 transmits transmission instruction information to the multi-function peripheral 10A through the communication I/F 55, for example. Then, the terminal program 65 receives the function information, which is transmitted by the multi-function peripheral 10A as a response to the transmission instruction information, from the multi-function peripheral 10A through the communication I/F 55. Then, the terminal program 65 temporarily stores the received function information in the memory 62. The processing of S21 is an example of the second receiving processing.

Subsequently, the terminal program 65 determines the functions implemented in the multi-function peripheral 10A, based on the function information received in S21 (S22, S25). That is, the terminal program 65 determines whether the automatic ordering function and the information notifying function are implemented in the multi-function peripheral 10A, based on the values set in the first function information and second function information received in S21. The processing of S22 and S25 is an example of the second determination processing.

Then, when it is determined that the second value "OFF" is set in the first function information and the first value "ON" is set in the second function information (S22: No & S25: Yes), the terminal program 65 sets the first value "ON" to the automatic ordering flag (S26). Then, the terminal program 65 transmits transmission request information to the multi-function peripheral 10A through the communication I/F 55 (S24). The transmission request information is information for requesting transmission of the consumable information and the ordering completion information. Hereinafter, the terminal program 65 repeatedly transmits the transmission request information to the multi-function peripheral 10A, which is the designated apparatus, with a predetermined time interval.

Also, when it is determined that the first value "ON" is set in the first function information (S22: Yes), the terminal program 65 sets the second value "OFF" to the automatic ordering flag and repeatedly transmits the transmission request information (S23, S24). Also, when it is determined that the second value "OFF" is set to both the first function information and the second function information (S22: No & S25: Yes), the terminal program 65 sets the second value "OFF" to the automatic ordering flag, and ends the ordering mode determining processing without executing the processing of S24 (S27).

Returning to FIG. 4, the terminal program 65 again displays the main screen on the display 53 (S11). The main screen that is to be herein displayed is different from FIG. 8A, in that the designated apparatus ID "MFP-A" is described in the switching icon 112, and the other is the same as FIG. 8A. Also, the terminal program 65 having started the repetitive transmission of the transmission request information in S24 may receive the ordering completion information or the consumable information during the display of the main screen or the status screen (which will be described later). When the ordering completion information or the consumable information is received, the terminal program 65 executes notification receiving processing. The notification receiving processing is described in detail with reference to FIG. 6.

In the below descriptions, it is assumed that the remaining ink amounts of the respective ink cartridges mounted to the mounting unit of the multi-function peripheral 10A are the black ink=70%, the cyan ink=0%, the magenta ink=100% and the yellow ink=5%. Also, it is assumed that the ink cartridge C has been already ordered to the server 80 by the manual ordering function of the multi-function peripheral 10A and the ink cartridge Y has not been ordered yet. That is, the ordering completion flag B is "OFF", the ordering completion flag C is "ON", the ordering completion flag M is "OFF" and the ordering completion flag Y is "OFF".

[Notification Receiving Processing]

First, when the ordering completion information C is received from the multi-function peripheral 10A through the communication I/F 25 (S31: ordering completed), the terminal program 65 determines the setting value of the automatic ordering flag (S32). When the first value "ON" is set to the automatic ordering flag (S32: ON), the terminal program 65 sets the first value "ON" to the cancel flag C and sets "gray" to the display information C (S33, S34). On the other hand, when the second value "OFF" is set to the automatic ordering flag (S32: OFF), the terminal program 65 executes the processing of S34 without executing the processing of S33. The processing of S31 receiving the ordering completion information is an example of the third receiving processing.

Also, when the consumable information is received from the multi-function peripheral 10A through the communication I/F 25 (S31: consumable), the terminal program 65 compares the remaining ink amount indicated by the consumable information with an upper limit (for example, 90%) and a lower limit (for example, 10%), which are examples of the threshold value, for each of the plurality of ink cartridges mounted to the mounting unit of the multi-function peripheral 10A (S35). The upper limit and the lower limit may be preset in the terminal program 65 or may be received from the multi-function peripheral 10A together with the function information and the like, for example. The processing of S31 receiving the consumable information is an example of the first receiving processing, and the processing of S35 is an example of the first determination processing.

When it is determined that the remaining ink amount of the ink cartridge B is less than the upper limit and equal to or greater than the lower limit (S35: other), the terminal program 65 does not execute the processing of S36 to S44. Also, when it is determined that the remaining ink amount of the ink cartridge M is equal to or greater than the upper limit (S35: Full), the terminal program 65 sets "standard" to the display information M (S36). Also, when it is determined that the remaining ink amounts of the ink cartridges C, Y are less than the lower limit (S35: Low), the terminal program 65 determines the setting value of the automatic ordering flag and the setting values of the cancel flags C, Y (S37, S38, S43). The condition that the remaining ink amount is less than the lower limit is an example of a case where the replacement condition of the ink cartridge is satisfied.

Subsequently, when the first value "ON" is set to the automatic ordering flag and the first value "ON" is set to the cancel flag C (S37: ON & S38: ON), the terminal program 65 sets the second value "OFF" to the cancel flag C, instead of the processing of S39 to S41 (which will be described later) (S42). That is, when the ink cartridge C first satisfies the replacement condition after the first value "ON" is set to the cancel flag C, the terminal program 65 does not execute the processing of S39.

On the other hand, when the first value "ON" is set to the automatic ordering flag and the second value "OFF" is set to the cancel flag Y (S37: ON & S38: OFF), the terminal program 65 transmits first ship request information to the server 80 through the communication I/F 55 (S39). The first ship request information is information for requesting the server to transmit the ink cartridge Y, for which it is determined in S35 that the replacement condition has been satisfied, to a destination indicated by the destination information. The first ship request information includes a consumable ID (for example, a model number) for identifying the ink cartridge Y of the multi-function peripheral 10A and the account information "abc" stored in the memory 62, for example. The processing of S39 is an example of the first transmission processing.

Although not shown, the server 80 receives the first ship request information from the information processing terminal 50. Then, the server 80 reads out the payment information and destination information associated with the account information "abc" included in the received first ship request information from the server memory. Then, the server 80 pays out a price for the ink cartridge Y, based on the read payment information. Then, the server 80 notifies an operator of a WEB shopping service of shipping the ink cartridge Y identified by the consumable ID included in the first ship request information to the destination indicated by the destination information read from the server memory.

Also, the terminal program 65 transmits the ordering completion information Y to the multi-function peripheral 10A through the communication I/F 55 (S40). In addition, the terminal program 65 sets "gray" to the display information Y (S41). Although not shown, the apparatus program 35 of the multi-function peripheral 10A receives the ordering completion information Y from the information processing terminal 50 through the communication I/F 25. Then, the apparatus program 35 notifies a user who intends to use the manual ordering function of the multi-function peripheral 10A that the ink cartridge Y has been already ordered by the automatic ordering function of the information processing terminal 50, through the display 23 or the like, for example.

After executing the notification receiving processing, the display information B is "standard", the display information C is "gray", the display information M is "standard" and the display information Y is "gray". On the other hand, when the second value "OFF" is set to the automatic ordering flag and the second value "OFF" is set to the cancel flag Y (S37: OFF & S43: OFF), the terminal program 65 sets "emphasis" to the display information Y (S44). On the other hand, when the second value "OFF" is set to the automatic ordering flag and the first value "ON" is set to the cancel flag Y (S37: OFF & S43: ON), the terminal program 65 does not execute the processing of S44. In this case, the display information B is "standard", the display information C is "gray", the display information M is "standard" and the display information Y is "emphasis".

Figure 9A:
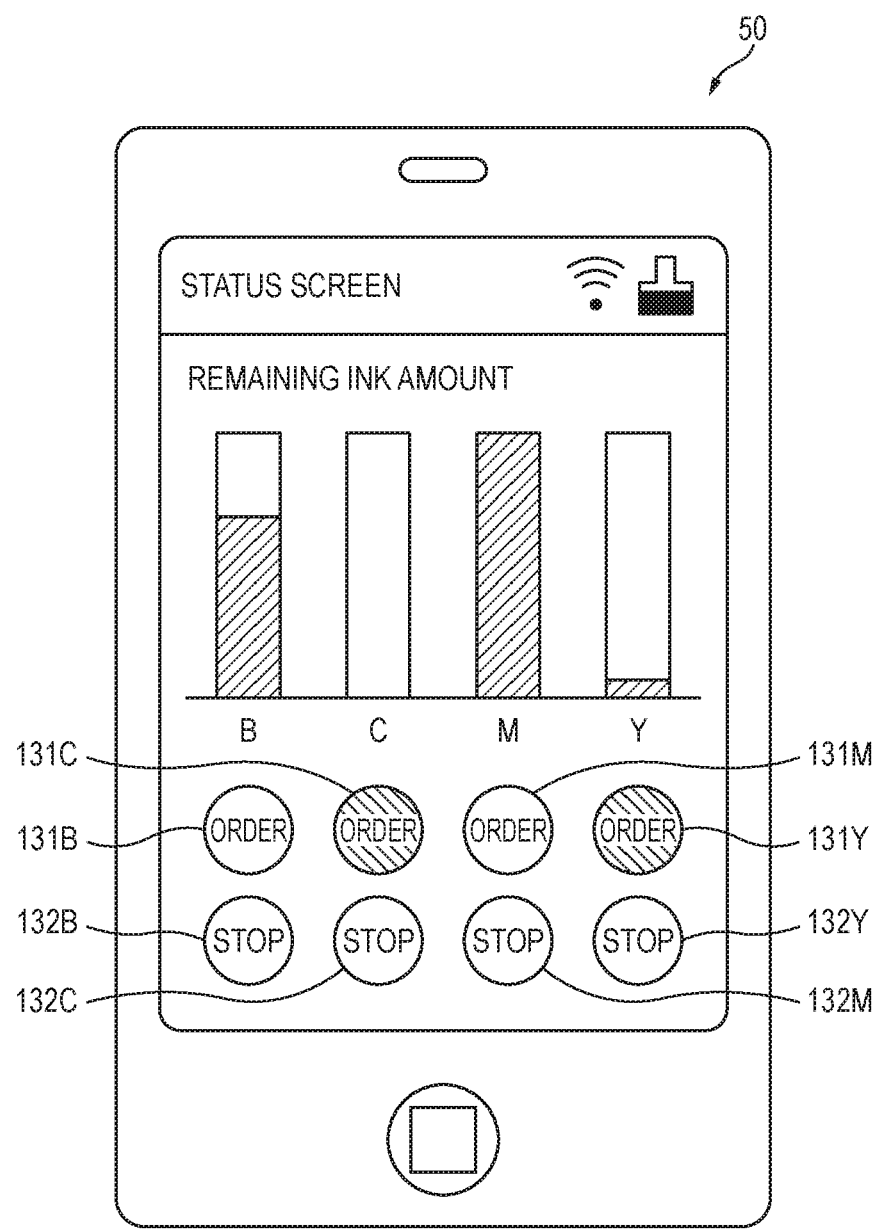
Figure 9B:
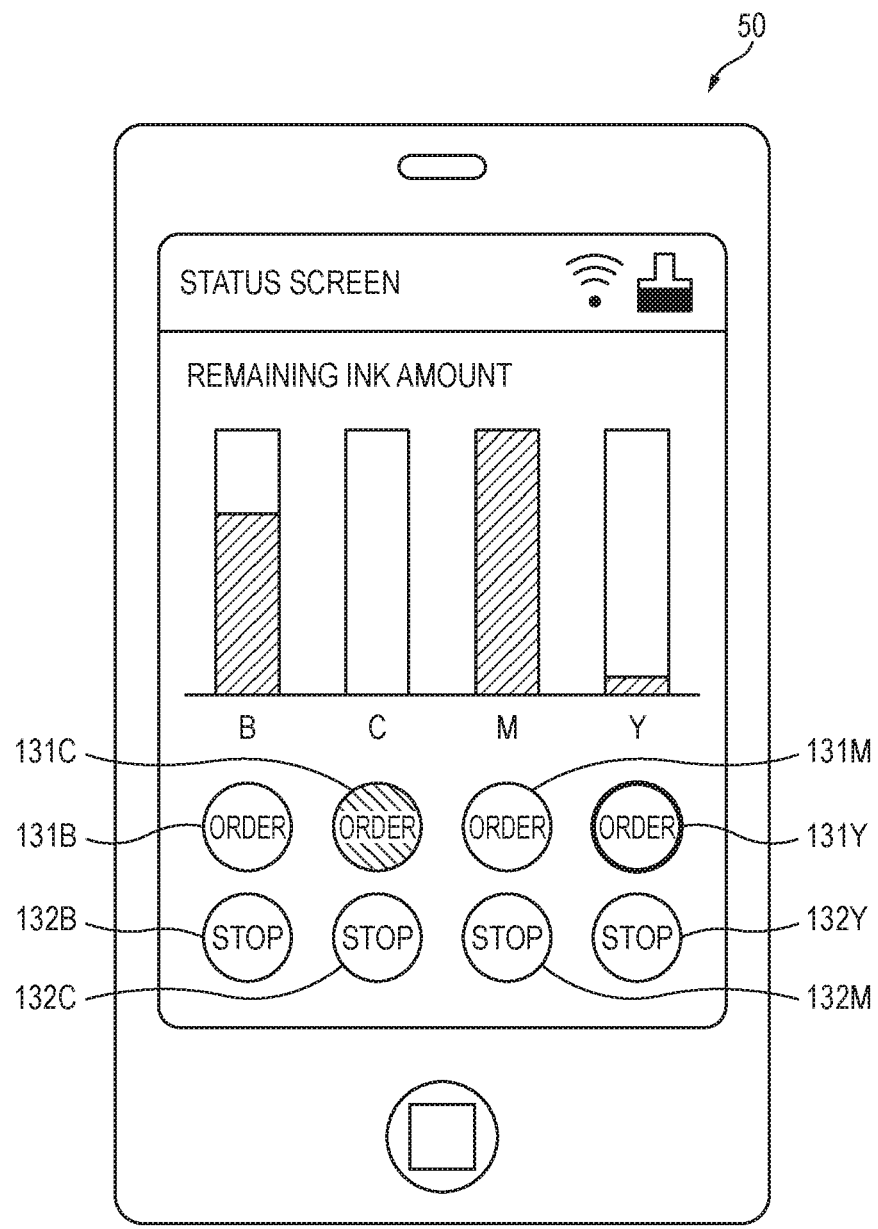

Again returning to FIG. 4, when a designation on the [status] icon 111 is received through the input I/F 54 (S12: status), the terminal program 65 displays a status screen shown in FIGS. 9A and 9B on the display 53 (S17). The processing of S17 is an example of the second display processing. Then, the terminal program 65 receives a user operation on the status screen through the input I/F 54 (S18).

The status screen includes bar graphs indicative of the remaining ink amounts of the ink cartridges B, C, M, Y indicated by the consumable information, ordering icons 131B, 131C, 131M, 131Y associated with the ink cartridges B, C, M, Y, and stop icons 132B, 132C, 132M, 132Y associated with the ink cartridges B, C, M, Y. The ordering icons 131B, 131C, 131M, 131Y are examples of the consumable object corresponding to the instruction for executing the manual ordering function for the corresponding ink cartridge. The stop icons 132B, 132C, 132M, 132Y correspond to the instruction for enabling the multi-function peripheral 10A to temporarily stop the ordering the corresponding ink cartridge.

Also, the terminal program 65 changes a display aspect of the ordering icons 131B, 131C, 131M, 131Y in accordance with the setting values of the corresponding display information B, C, M, Y. In the example of FIG. 9A, the ordering icons 131B, 131M corresponding to the display information B, M in which "standard" is set are displayed in an aspect where they can be designated through the input I/F 54. On the other hand, the ordering icons 131C, 131Y corresponding to the display information C, Y in which "gray" is set are displayed in an aspect where they cannot be designated through the input I/F 54. Meanwhile, in the example of FIG. 9B, the ordering icon 131Y corresponding to the display information Y in which "emphasis" is set is displayed in an aspect where it can be designated through the input I/F 54 and it is more emphasized than the ordering icons 131B, 131M corresponding to the display information B, M in which "standard" is set.

In the meantime, the "designable aspect" indicates that when an icon is designated through the input I/F 54, the terminal program 65 executes processing associated with the corresponding icon. On the other hand, the "non-designable aspect" indicates that even when an icon is designated through the input I/F 54, the terminal program 65 does not execute processing associated with the corresponding icon. Also, in the "non-designable aspect", the corresponding icon may be displayed in a gray-out form, as shown in the example of FIGS. 9A and 9B, or may not be displayed. Also, in the "emphasis" aspect, an outline of the corresponding icon may be thickened, as shown in the example of FIG. 9B, or the corresponding icon may be blinked or color-changed.

Then, when a user operation on the status screen is received through the input I/F 54 (S18: Yes), the terminal program 65 executes ordering processing (S19). The ordering processing is described in detail with reference to FIG. 7.

When a designation on the ordering icon 131B is received through the input I/F 54 (S51: ordering), for example, the terminal program 65 displays a device selection screen shown in FIG. 8B on the display 53 (S52). Then, the terminal program 65 receives a user operation on the device selection screen through the input I/F 54 (S53). The processing of S51 receiving the designation of the ordering icon is an example of the second reception processing. The processing of S52 and S53 may be the same as S13 to S15.

Subsequently, when a designation of the device icon 122 is received through the input I/F 54 (S53: Yes), for example, the terminal program 65 temporarily stores the apparatus ID "MFP-B" of the multi-function peripheral 10B corresponding to the device icon 121 in the memory 62. Also, although not shown, the terminal program 65 receives the function information from the multi-function peripheral 10B identified with the apparatus ID "MFP-B" temporarily stored in S53, through the communication I/F 55. Then, the terminal program 65 determines whether the automatic ordering function has been implemented in the multi-function peripheral 10B, based on the received function information (S54). This processing may be the same as S21 and S22.

Figure 10A:
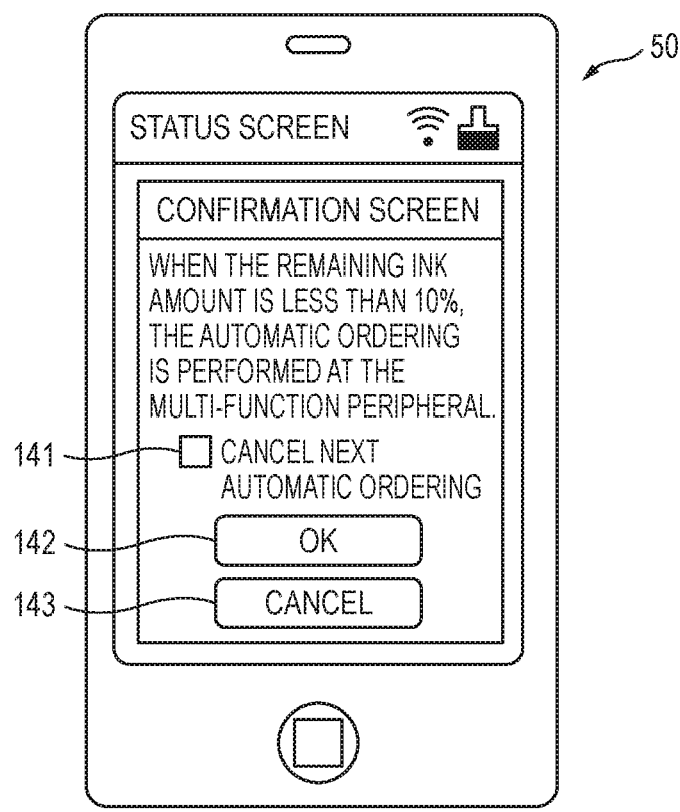

Subsequently, when it is determined that the automatic ordering function has been implemented in the multi-function peripheral 10B (S54: Yes), the terminal program 65 displays a confirmation screen shown in FIG. 10A on the display 53 (S55). The confirmation screen of the illustrative embodiment is a popup window that is to be displayed with overlapping over the status screen. Then, the terminal program 65 receives a user operation on the confirmation screen through the input I/F 54 (S56). The processing of S55 is an example of the third display processing, and the processing of S56 is an example of the third reception processing.

The confirmation screen is an example of a screen for notifying that the automatic ordering function has been implemented in the multi-function peripheral 10B and inquiring of the user whether or not to execute processing of S58 (which will be described later). The confirmation screen includes a message "When the remaining ink amount is less than 10%, the automatic ordering is performed at the multi-function peripheral.", a check box 141, an [OK] icon 142 and a [cancel] icon 143. The check box 141 corresponds to an instruction as to whether or not to transmit ship restraint information (which will be described later). The [OK] icon 142 corresponds to an instruction for executing the processing of S58. The [cancel] icon 143 corresponds to an instruction for not executing the processing of S58.

Then, when a designation of the [OK] icon 142 is received through the input I/F 54 (S56: OK (checked)) after the check box 141 is checked, the terminal program 65 transmits ordering restraint information to the multi-function peripheral 10B through the communication I/F 55 (S57). The ordering restraint information is information for temporarily stopping the multi-function peripheral 10B from executing the automatic ordering function. The ordering restraint information includes the consumable ID for identifying the ink cartridge B of the multi-function peripheral 10B, for example. The processing of S57 is an example of the third transmission processing.

Also, the terminal program 65 transmits second ship request information to the server 80 through the communication I/F 55 (S58). The processing of S58 is an example of the second transmission processing. The second ship request information is information for requesting the server to transmit the ink cartridge B, which corresponds to the ordering icon 131B designated in S51 of the plurality of ink cartridges of the multi-function peripheral 10B identified with the apparatus ID "MFP-B" temporarily stored in S53, to a destination indicated by the destination information. The second ship request information includes the consumable ID for identifying the ink cartridge B of the multi-function peripheral 10B and the account information "abc" stored in the memory 62, for example. The processing that is to be executed by the server 80 having received the second ship request information may be the same as the processing that is to be executed when the first ship request information is received.

On the other hand, when the check box 141 is not checked and the designation of the [OK] icon 142 is received through the input I/F 54 (S56: OK (no check)), the terminal program 65 executes the processing of S58 without executing the processing of S57. Also, when a designation of the [cancel] icon 143 is received through the input I/F 54 (S56: cancel), the terminal program 65 ends the ordering processing without executing the processing of S57 and S58. Also, when it is determined that the automatic ordering function has not been implemented in the multi-function peripheral 10B (S54: No), the terminal program 65 executes the processing of S58 without executing the processing of S55 to S57.

Figure 10B:
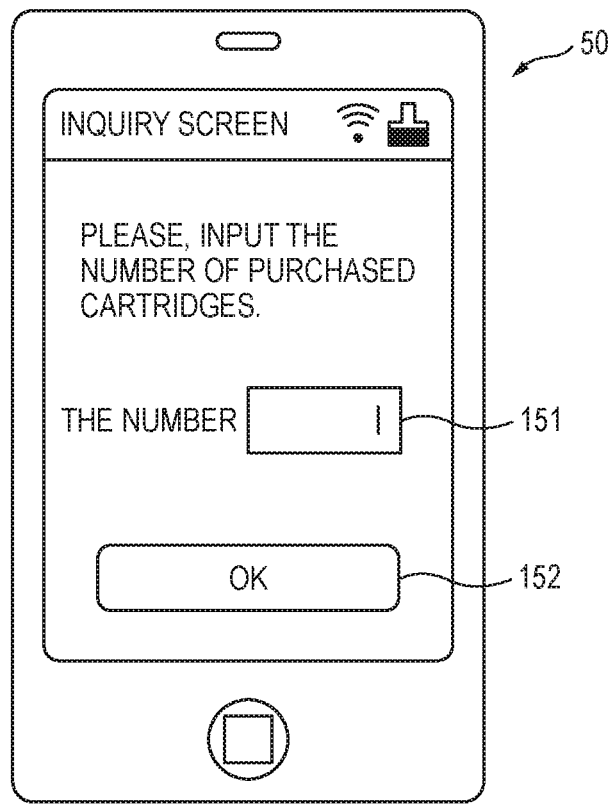

Also, when a designation of the stop icon 132M is received through the input I/F 54 (S51: stop ordering), for example, the terminal program 65 displays an inquiry screen shown in FIG. 10B on the display 53 (S59). The processing of S51 receiving the designation of the stop icon is an example of the fourth reception processing. The inquiry screen includes a message "Please, input the number of purchased cartridges.", a text box 151 and an [OK] icon 152. The text box 151 is an object for displaying the number of ink cartridges input through the input I/F 54. The [OK] icon 152 corresponds to an instruction for transmitting the ordering restraint information. The terminal program 65 receives a user operation on the inquiry screen through the input I/F 54 (S60).

When the user operation of inputting the number of purchased ink cartridges M is received through the input I/F 54, the terminal program 65 displays the corresponding number on the text box 151 and temporarily stores the same in the memory 62. Also, when a designation of the [OK] icon 152 is received through the input I/F 54 (S60: Yes), the terminal program 65 transmits the ordering restraint information to the multi-function peripheral 10A through the communication I/F 55 (S61). The processing of S61 may be the same as the processing of S57. However, the ordering restraint information that is to be transmitted in the processing of S61 includes number information indicative of the number of ink cartridges temporarily stored in the memory 62 as well as the consumable ID of the ink cartridge M corresponding to the stop icon 132M designated in S51.

[Operational Effects of Illustrative Embodiment]

According to the illustrative embodiment, the information processing terminal 50 can automatically order the consumable of the multi-function peripheral 10A having no automatic ordering function at the appropriate timing. Thereby, it is possible to suppress an operation rate of the multi-function peripheral 10A from being lowered, which is caused when the consumable runs short. In the meantime, the function of transmitting the consumable information has been already implemented in most of the existing multi-function peripherals 10 so as to notify the same to a so-called status monitor or the like. That is, the disclosure can also be applied to the existing multi-function peripheral 10.

Also, according to the illustrative embodiment, the setting value of the automatic ordering flag is switched on the basis of the first function information of the designated apparatus. More specifically, only the consumable of the multi-function peripheral 10A having no automatic ordering function is ordered by the automatic ordering function of the information processing terminal 50. On the other hand, the consumable of the multi-function peripheral 10B having the automatic ordering function is not ordered by the automatic ordering function of the information processing terminal 50. Thereby, it is possible to suppress a situation where the automatic ordering is doubly executed at both the multi-function peripheral 10B and the information processing terminal 50.

Also, according to the illustrative embodiment, when it is first determined in S35 that the replacement condition is satisfied after the ordering completion information is received the multi-function peripheral 10, the terminal program 65 does not execute the processing of S39. Thereby, it is possible to suppress a situation where the automatic ordering by the information processing terminal 50 is doubly executed after the consumable is ordered through the multi-function peripheral 10. In the meantime, the ordering completion information may include the number information indicative of the number n of the ordered ink cartridges. Also, even when it is determined in S35 that the replacement condition is satisfied after the ordering completion information is received the multi-function peripheral 10, the terminal program 65 may cancel the processing of S39 n-times.

Also, the terminal program 65 of the illustrative embodiment has not only the automatic ordering function but also the manual ordering function. That is, the user who predicts a future operating situation of the multi-function peripheral 10 can order the ink cartridge through the ordering icons 131B, C, M, Y at a desired timing. Also, the display aspect of the ordering icons 131B, C, M, Y is switched in accordance with the display information. Thereby, it is possible to enable the user to appropriately recognize an ink cartridge (for example, the display information="gray") that should not be manually ordered and an ink cartridge (for example, the display information="emphasis") that should be manually ordered.

Also, according to the illustrative embodiment, when it is intended to order the ink cartridge of the multi-function peripheral 10B having the automatic ordering function by the manual ordering function of the terminal program 65, a possibility that the ink cartridge is to be doubly ordered is notified to the user through the confirmation screen. Also, when the user instructs the execution of the manual ordering function through the confirmation screen, the ordering restraint information is transmitted to the multi-function peripheral 10B. Thereby, it is possible to suppress a situation where the manual ordering by the information processing terminal 50 and the automatic ordering by the multi-function peripheral 10 are to be doubly executed.

Also, according to the illustrative embodiment, when the number of the ink cartridges purchased by the user is input through the inquiry screen, the ordering restraint information including the number information indicative of the corresponding number is transmitted to the multi-function peripheral 10. Thereby, for example, when the user purchases the consumable (for example, at a mass merchandise outlet) without using the ordering functions of the multi-function peripheral 10 and the information processing terminal 50, it is possible to temporarily stop the automatic ordering function of the multi-function peripheral 10. That is, the multi-function peripheral 10 may stop the automatic ordering of the number indicated by the number information of the ordering restraint information.

In the meantime, the processing that is executed when the second value "OFF" is set to the automatic ordering flag in S37 is not limited to the example of the illustrative embodiment. As another example, when it is determined that the remaining ink amount is less than the lower limit and the second value "OFF" is set to the automatic ordering flag (S35: Low & S37: OFF), the terminal program 65 may determine whether the multi-function peripheral 10 can perform communication with the server 80. More specifically, the terminal program 65 may inquire of the multi-function peripheral 10 whether the multi-function peripheral 10 can perform communication with the server 80. This processing is an example of the third determination processing. When it is determined that the multi-function peripheral 10 cannot perform communication with the server 80, the terminal program 65 may execute the processing of S39 to S41.

In the meantime, when an inquiry is received from the information processing terminal 50, for example, the apparatus program 35 of the multi-function peripheral 10A may transmit an echo request to the server 80 in accordance with an ICMP (abbreviation of Internet Control Message Protocol). Then, when an echo reply is received from the server 80, the apparatus program 35 may issue a response indicating that it is possible to perform communication with the server 80. On the other hand, when an echo reply is not received from the server 80, the apparatus program 35 may issue a response indicating that it is not possible to perform communication with the server 80.

According to the above configuration, when it is not possible to temporarily execute the automatic ordering by the multi-function peripheral 10 even though the second value "OFF" is set to the automatic ordering flag, the automatic ordering is executed by the information processing terminal 50. Thereby, it is possible to suppress the operation rate of the multi-function peripheral 10 from being lowered, which is caused when the consumable runs short.

Also, the first ship request information and the second ship request information may be information of notifying the status of the consumable of the multi-function peripheral 10 to the server 80, instead of positively requesting the server 80 to ship the consumable. That is, the first ship request information and the second ship request information may further include the consumable information received previously from the multi-function peripheral 10. The server 80 may determine whether the status of the consumable indicated by the consumable information satisfies the replacement condition and start a procedure of shipping the consumable when it is determined that the replacement condition is satisfied.

Also, in the illustrative embodiment, the ink cartridge is an example of the consumable. However, the specific example of the consumable is not limited to the ink cartridge. For example, as other examples of the consumable to be used for the print operation, a toner cartridge having toner reserved therein, a drum cartridge having a drum accommodated therein and the like may be exemplified. Also, as other examples of the consumable to be used for the scan operation, a roller configured to convey a document and the like may be exemplified. That is, the consumable of the illustrative embodiment corresponds to all products that are to gradually wear as the multi-function peripheral 10 operates and the multi-function peripheral 10 cannot execute the operation when the products wear out.

The replacement condition in S35 is different depending on the consumables. As an example, when the consumable is a toner cartridge, the replacement condition is that a remaining amount of the toner reserved in the toner cartridge is less than a threshold value, for example. As another example, when the consumable is a drum cartridge, the replacement condition is that the number of printed sheets in the print operation is equal to or greater than a threshold value, for example. As still another example, when the consumable is a roller, the replacement condition is that the number of rotations of the roller is equal to or greater than a threshold value, for example.

Also, in the multi-function peripheral 10 and the information processing terminal 50 of the illustrative embodiment, the various programs stored in the memories 32, 62 are executed by the CPUs 31, 61, so that the respective processing to be executed by the controller of the disclosure is implemented. However, the configuration of the controller is not limited thereto and some or all of the controller may be implemented by the hardware such as an integrated circuit and the like.

Also, the disclosure can be implemented as not only the multi-function peripheral 10 and the information processing terminal 50 but also a program configured to enable the multi-function peripheral 10 and the information processing terminal 50 to execute the processing. The program may be provided with being recorded in a non-transitory recording medium. The non-transitory recording medium may include a memory mounted on a server that can be connected to the multi-function peripheral 10 and the information processing terminal 50 through the communication network, in addition to a CD-ROM, a DVD-ROM and the like. The program stored in the memory of the server may be transmitted through the communication network such as the Internet 101, as information or signal indicative of the program.

What is claimed is:

1. A non-transitory computer-readable medium having a computer program stored thereon and readable by a computer of an information processing terminal, the information processing terminal comprising a communication interface, a display and an input interface, the computer program, when executed by the computer, causes the information processing terminal to perform:
    displaying a first screen on the display, the first screen including a plurality of apparatus objects corresponding to each of a plurality of image processing apparatuses capable of performing communication through the communication interface;
    receiving a first user operation of designating one of the apparatus objects, through the input interface;
    receiving consumable information from the designated apparatus through the communication interface, the designated apparatus being the image processing apparatus corresponding to the apparatus object designated in the receiving of the first user operation, and the consumable information indicating a status of a consumable to be used for an operation of the image processing apparatus;
    receiving first function information from the designated apparatus through the communication interface, the first function information indicating whether an automatic ordering function is implemented in the designated apparatus;
    determining a function implemented in the designated apparatus from the function information;
    determining whether a status indicated by the consumable information satisfies a replacement condition of the consumable; and
    in response to it being determined in the determining of the function that the first function information indicates that the automatic ordering function is not implemented in the designated apparatus and it being determined in the determining of the status that the replacement condition is satisfied, transmitting first ship request information to a server through the communication interface, the first ship request information being for requesting the server to ship the consumable, for which it is determined in the determining of the status that the replacement condition is satisfied, to a predetermined destination,
    wherein in response to it being determined in the determining of the function that the first function information indicates that the automatic ordering function is implemented in the designated apparatus, the computer program, when executed by the computer, causes the information processing terminal not to perform the transmitting of the first ship request information.

2. The non-transitory computer-readable medium according to claim 1,
    wherein in the receiving of the first function information, the computer program causes the information processing terminal to further receive second function information from the designated apparatus through the communication interface, the second function information indicating whether an information notifying function for transmitting the consumable information is implemented in designated apparatus, and
    wherein the computer program causes the information processing terminal to perform the determining of the status indicated by the consumable information and the transmitting of the first ship request information, in response to it being determined in the determining of the function that the first function information indicates that the automatic ordering function is not implemented and the second function information indicates that the information notifying function is implemented.

3. The non-transitory computer-readable medium according to claim 2, wherein the computer program, when executed by the computer, causes the information processing terminal to perform:
    displaying a second screen on the display, the second screen including consumable objects corresponding to consumables to be used for an operation of the designated apparatus;
    receiving a second user operation of designating one of the consumable objects, through the input interface; and
    in response to the consumable object being designated in the receiving of the second user operation, transmitting second ship request information to the server through the communication interface, the second ship request information being for requesting the server to ship the consumable corresponding to the consumable object designated in the receiving of the second user operation to a predetermined destination.

4. The non-transitory computer-readable medium according to claim 3, wherein the computer program causes the information processing terminal to perform:
    in response to it being determined in the determining of the function that the automatic ordering function is implemented and the consumable object being designated in the receiving of the second user operation, displaying a third screen on the display, the third screen being for notifying that the automatic ordering function is implemented and for inquiring whether or not to perform the transmitting of the second ship request information;
    receiving a third user operation of instructing performing of the transmitting of the second ship request information, through the input interface; and
    the transmitting of the second ship request information in response to the performing of the transmitting of the second ship request information being instructed in the receiving of the third user operation.

5. The non-transitory computer-readable medium according to claim 4, wherein the computer program, when executed by the computer, causes the information processing terminal to perform:
    transmitting ordering restraint information to the designated apparatus through the communication interface in response to the performing of the transmitting of the second ship request information being instructed in the receiving of the third user operation, the ordering restraint information being for temporarily stopping execution of the automatic ordering function.

6. The non-transitory computer-readable medium according to claim 5, wherein the computer program, when executed by the computer, causes the information processing terminal to perform:
receiving a fourth user operation of instructing stop of the automatic ordering function of the designated apparatus, through the input interface; and
the transmitting of the ordering restraint information in response to the stop of the automatic ordering function being instructed in the receiving of the fourth user operation.

7. The non-transitory computer-readable medium according to claim 3, wherein the computer program, when executed by the computer, causes the information processing terminal to perform:
receiving ordering completion information from the designated apparatus through the communication interface, the ordering completion information indicating that the image processing apparatus has executed processing corresponding to the transmitting of the first ship request information, and
wherein in the displaying of the second screen after receiving the ordering completion information, the computer program causes the information processing terminal to disable the consumable object, which corresponds to the consumable for which ordering completion is indicated by the ordering completion information, from being designated in the receiving of the second user operation.

8. The non-transitory computer-readable medium according to claim 3, wherein in the displaying of the second screen, the computer program causes the information processing terminal to display the consumable object corresponding to the consumable for which it is determined in the determining of the status that the replacement condition is satisfied in a more emphasized aspect than the consumable object corresponding to the consumable for which it is determined in the determining of the status that the replacement condition is not satisfied.

9. The non-transitory computer-readable medium according to claim 1, wherein the computer program, when executed by the computer, causes the information processing terminal to perform:
determining whether the designated apparatus is able to perform communication with the server; and
in response to it being determined in the determining of the status that the replacement condition is satisfied, it being determined in the determining of the function that the automatic ordering function is implemented and it being determined in the determining of the performability of communication that the designated apparatus is unable to perform communication with the server, the transmitting of the first ship request information.

10. The non-transitory computer-readable medium according to claim 2, wherein the computer program, when executed by the computer, causes the information processing terminal to perform:
receiving ordering completion information from the designated apparatus through the communication interface, the ordering completion information indicating that the image processing apparatus has executed processing corresponding to the transmitting of the first ship request information; and
in response to it being first determined in the determining of the status that the replacement condition is satisfied after the ordering completion information is received, the disabling the information processing terminal from executing the transmitting of the first ship request information.

11. The non-transitory computer-readable medium according to claim 1, wherein the computer program, when executed by the computer, causes the information processing terminal to perform:
receiving function information from the designated apparatus through the communication interface;
determining functions implemented in the designated apparatus based on the received function information; and
in response to it being determined that the designated apparatus does not have automatic ordering function but has the information notifying information, validating automatic ordering function of the information processing terminal;
in response to it being determined in the determining of the status that the replacement condition is satisfied, determining whether the automatic ordering function is validated; and
in response to it being determined that the automatic ordering function is validated, transmitting the first ship request information to the server through the communication interface.

12. The non-transitory computer-readable medium according to claim 1, wherein the computer program, when executed by the computer, causes the information processing terminal to repeatedly execute the receiving of the consumable information with a predetermined time interval.

13. An information processing terminal comprising:
a communication interface;
a display;
an input interface; and
a controller configured to:
display, on the display, a plurality of apparatus objects corresponding to each of a plurality of image processing apparatuses capable of performing communication through the communication interface;
receive a user operation of designating one of the apparatus objects, through the input interface;
receive consumable information from the designated apparatus through the communication interface, the designated apparatus being the image processing apparatus corresponding to the apparatus object designated in the receiving of the user operation, and the consumable information indicating a status of a consumable to be used for an operation of the image processing apparatus;
receive first function information from the designated apparatus through the communication interface, the first function information indicating whether an automatic ordering function is implemented in the designated apparatus;
determine a function implemented in the designated apparatus from the function information;
determine whether a status indicated by the consumable information satisfies a replacement condition of the consumable; and
in response to it being determined in the determining of the function that the first function information indicates that the automatic ordering function is not implemented in the designated apparatus and it being determined in the determining of the status that the replacement condition is satisfied, transmit first ship request information to a server through the communication interface, the first ship request information being information for requesting the server to ship the consumable, for which it is determined in the determining of the status that the replacement condition is satisfied, to a predetermined destination, wherein in response to it being determined in the determining of the function that the first function information indicates that the automatic ordering function is implemented in the designated apparatus, the controller is configured not to perform the transmitting of the first ship request information.

14. A consumable ordering method of ordering a consumable to be used for an operation of an image processing apparatus by using an information processing terminal, the information processing terminal comprising a communication interface, a display and an input interface, the consumable ordering method comprising:

displaying, on the display, a plurality of apparatus objects corresponding to each of a plurality of image processing apparatuses capable of performing communication through the communication interface;

receiving a user operation of designating one of the apparatus objects, through the input interface;

receiving consumable information from the designated apparatus through the communication interface, the designated apparatus being the image processing apparatus corresponding to the apparatus object designated in the receiving of the user operation, and the consumable information indicating a status of the consumable;

receiving first function information from the designated apparatus through the communication interface, the first function information indicating whether an automatic ordering function is implemented in the designated apparatus;

determining a function implemented in the designated apparatus from the function information;

determining whether a status indicated by the consumable information satisfies a replacement condition of the consumable; and in response to it being determined in the determining of the function that the first function information indicates that the automatic ordering function is not implemented in the designated apparatus and it being determined in the determining of the status that the replacement condition is satisfied, transmitting first ship request information to a server through the communication interface, the first ship request information being for requesting the server to ship the consumable, for which it is determined in the determining of the status that the replacement condition is satisfied, to a predetermined destination, wherein in response to it being determined in the determining of the function that the first function information indicates that the automatic ordering function is implemented in the designated apparatus, the method does not perform the transmitting of the first ship request information.

* * * * *